United States Patent Office 2,768,160
Patented Oct. 23, 1956

2,768,160

AZO COMPOUNDS CONTAINING A HYDROXY SUBSTITUTED POLYFLUORINATED GROUP

Joseph B. Dickey and Edmund B. Towne, Kingsport, Tenn., assignors to Eastman Kodak Company, Rochester, N. Y., a corporation of New Jersey No Drawing. Original application February 15, 1951, Serial No. 211,177, now Patent No. 2,700,686, dated January 25, 1955. Divided and this application September 30, 1953, Serial No. 383,378

5 Claims. (Cl. 260—207.5)

This invention relates to new hydroxy substituted polyfluorinated compounds. More particularly the invention relates to valuable new aliphatic chlorohydrin and bromohydrin compounds containing two or three fluorine atoms and wherein the fluorine atmos present are attached to the same carbon atom and to a process for preparing the new compounds of the invention.

The invention is particularly directed to the valuable new halohydrin compounds 3,3,3-trifluoro-2-chloro-1-hydroxypropane, 3,3,3 - trifluoro - 2 - bromo - 1-hydroxypropane, 3,3,3-trifluoro-2-chloro-2-methyl-1-hydroxypropane, 3,3,3 - trifluoro - 2-bromo-2-methyl-1-hydroxypropane, 4,4,4-trifluoro-2-hydroxyl-1-chlorobutane, 4,4,4-trifluoro-2-hydroxy-1-bromobutane, 3,3-difluoro-2-chloro-1-hydroxypropane, 3,3-difluoro-2-bromo-1-hydroxypropane, 3,3-difluoro-2-chloro-2-methyl-1-hydroxypropane, 3,3-difluoro-2-bromo-2-methyl-1-hydroxypropane, 3,3-difluoro-2-chloro-1-hydroxybutane and 3,3-difluoro-2-bromo-1-hydroxybutane and to a process for preparing these compounds.

The new halohydrin componds of the invention are prepared by reacting 3,3,3-trifluoropropene $(CF_3CH=CH_2)$ 3,3,3-trifluoro-2-methylpropene

4,4,4 - trifluoro - 1 - butene $(CF_3CH_2CH=CH_2)$, 3,3-difluoropropene $(CHF_2CH=CH_2)$, 3,3-difluoro-2-methylpropene

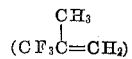

and 3,3-difluoro-1-butene $(CH_3CF_2CH=CH_2)$, respectively, with hypochlorous acid and hypobromous acid, respectively, in an aqueous medium.

The hypochlorous acid solution used in the process of the invention can be prepared by a number of well-known methods. A satisfactory method for its production is described in Organic Syntheses, collective volume 1, page 158. The hypochlorous acid solution can also be prepared by bubbling chlorine into a cold aqueous solution of sodium bicarbonate until the carbon dioxide formed ceases to be evolved. The resulting solution can be used to prepare the new halohydrin compounds. Further, by acidifying an aqueous solution of bleaching powder $[Ca(OCl)_2 \cdot 4H_2O]$ with a strong mineral acid, hypochlorous acid is formed and the resulting solution can be used to prepare the new halohydrin compounds of the invention. The hypobromous acid solution can be prepared by known methods. It can be prepared, for example, by adding 8 grams of sodium hydroxide dissolved in 24 cc. of water to 16 grams of bromine in 96 cc. of water. These proportions can be followed in preparing larger amounts of hypobromous acid solution.

The new halohydrin compounds because of their high reactivity have wide utility as intermediates. Poly-fluorinated alcohols, glycols, ethers and amines, for example, can be prepared by the reaction of the new halohydrin compounds with water, alcohols, ammonia and amines. As illustrated hereinafter, they are of particular valve in the preparation of dye compounds suitable, for example, for the dyeing of cellulose ester, especially cellulose acetate, textile materials.

By reacting the new halohydrin compounds in an alkaline aqueous solution, new polyfluorinated aliphatic alkylene oxide compounds are obtained. These new compounds have the formulas:

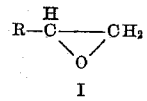

I and

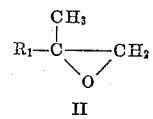

II wherein R represents a trifluoromethyl group, a $\beta,\beta,\beta$-trifluoroethyl group, a difluoromethyl group or an $\alpha,\alpha$-difluoroethyl group and $R_1$ represents a trifluoromethyl group or a difluoromethyl group.

The new halohydrin compounds of the invention as shown hereinafter react with primary and secondary arylamines such as aniline, m-toluidine, m-ethylaniline, 2-methoxy-5-methylaniline, o-chloroaniline, m-chloroaniline, m-bromoaniline, N-methylaniline, N-ethylaniline, N-isopropylaniline, N-n-butylaniline, N-$\beta$-hydroxyethylaniline, N-$\beta$-hydroxypropylaniline, N-$\gamma$-hydroxypropylaniline, N-$\beta$-hydroxyethyl-m-toluidine, N - $\beta$ - hydroxyethyl-m-chloroaniline, N-$\beta$-hydroxyethyl - m - bromoaniline, N-$\beta$-cyanoethylaniline, N-$\beta$-cyanoethyl-m-chloroaniline, and N-ethyl-m-chloroaniline, for example. In this reaction a hydrogen atom attached to the nitrogen atom of the arylamine and the chlorine or bromine atom of the halohydrin compound are replaced. Where a primary arylamine is employed, both hydrogen atoms attached to the nitrogen atom can be replaced. Similarly, the new halohydrin compounds of the invention react with tetrahydroquinoline compounds and benzomorpholine compounds having a replaceable hydrogen atom attached to the nuclear nitrogen atom. Illustrative of such compounds are tetrahydroquinoline, 2-methyltetrahydroquinoline, 2,7-dimethyltetrahydroquinoline, benzomorpholine and 2-methylbenzomorpholine.

Likewise, the polyfluorinated aliphatic alkylene oxide compounds having the formulas numbered I and II react with the arylamine, tetrahydroquinoline and benzomorpholine compounds referred to in the preceding paragraph. The nature of the reaction will be clear from the following equation illustrating the reaction between 3,3,3-trifluoro-1,2-n-propylene oxide and aniline:

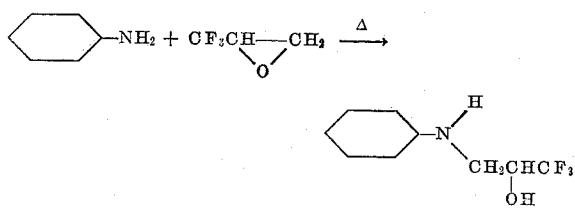

The compounds referred to in the last two paragraphs are useful as intermediates for the preparation of azo dye compounds which color cellulose acetate textile materials. To illustrate, they can be coupled with the diazonium forms of monocyclic nonsulfonated primary arylamines of the benzene series to form such dye compounds. Illustrative of the primary arylamines that can be used are p- nitroaniline, 1-amino-2-chloro-4-nitrobenzene, 2-amino-5-nitrophenylmethylsulfone, 5 - nitro - 2-trifluoromethylaniline, 1-amino-2-bromo-4-nitroaniline, 1-amino-2-fluoro-4-nitroaniline, p-aminoacetophenone, 1-amino-2-cyano-4-nitroaniline and o-aminophenylmethylsulfone.

The following examples illustrate the invention.

*Example 1.*—22 grams of 3,3,3-trifluoro-2-methylpropene, B. P. 6.4° C., were bubbled slowly during 2–3 hours into 0.2 gram mole of a stirred aqueous solution of HOCl kept at −5° C. to 0° C. (the HOCl solution used in this example and the other examples was prepared as described in Organic Syntheses, Collective volume 1, page 158). The reaction mixture was then stirred for 3 hours more at −5° C. to 0° C. and then was allowed to come up to room temperature. The solution was saturated with sodium chloride and extracted with five 100 cc. portions of ethyl ether. The ether extract was dried over sodium sulfate and then filtered. The ether was distilled off and the residue remaining was fractionated under reduced pressure to yield a small forerun and 19 grams of 3,3,3-trifluoro-2-chloro-2-methyl-1-hydroxypropane, B. P. 67° C.–70° C./37 mm. The product is a water-clear liquid, soluble in ethyl alcohol and ethyl ether and somewhat soluble in water.

By the use of a hypobromous acid solution in place of the HOCl solution in the foregoing example, 3,3,3-trifluoro-2-bromo-2-methyl-1-hydroxypropane is obtained. It also is a water-clear liquid soluble in ethyl alcohol and ethyl ether and somewhat soluble in water.

*Example 2.*—19.2 grams of 3,3,3-trifluoropropene, B. P. −24° C., were very slowly bubbled during 2 to 3 hours into 0.2 gram mole of a stirred aqueous solution of HOCl cooled to −10° C. The reaction mixture was contained in a flask fitted with a sealed stirrer and a Dry Ice condenser. Stirring was continued for 3 hours at −10° C., after the 3,3,3-trifluoropropene had been completely added after which the reaction mixture was allowed to come up to room temperature. It was saturated with sodium chloride and the reaction product which separated as a layer was extracted from the reaction mixture with five 50 cc. portions of ethyl ether. The ethyl ether extract was dried over sodium sulfate and filtered. Then the ether was distilled off from the ether extract and the residue remaining was fractionated under reduced pressure to yield 18 grams of 3,3,3-trifluoro-2-chloro-1-hydroxypropane. The compound is a colorless liquid, slightly soluble in water and soluble in the usual organic solvents. It had a boiling point of 111° C.–115° C.

*Example 3.*—22 grams of 4,4,4-trifluoro-1-butene, B. P. 8° C., was bubbled into a cooled aqueous solution of HOCl (0.2 gram mole) in accordance with the procedure described in Example 2. Upon working up the reaction mixture in the manner described in Example 2, 21 grams of 4,4,4-trifluoro-1-chloro-2-hydroxybutane, B. P. 70° C.–73° C./36 mm., were obtained. It is a colorless liquid somewhat soluble in water and soluble in the usual organic solvents.

By the use of 0.2 gram mole of a hypobromous acid solution in place of the HOCl solution, 4,4,4-trifluoro-1-bromo-2-hydroxybutane is obtained. It has the same general properties as 4,4,4-trifluoro-1-chloro-2-hydroxybutane.

*Example 4.*—18.4 grams of 3,3-difluorobutene, B. P. 24° C., were bubbled into a cooled aqueous solution of HOCl in accordance with the procedure described in Example 2. Upon working up the reaction mixture in the same manner as described in Example 2, 16 grams of 3,3-difluoro-2-chloro-1-hydroxybutane, B. P. 85° C.–88° C./36 mm., were obtained. It is a colorless liquid, slightly soluble in water and soluble in the usual organic solvents.

By the use of 0.2 gram mole of an aqueous hypobromous acid solution in place of the aqueous HOCl solution used in the above example, a good yield of 3,3-difluoro-2-bromo-1-hydroxybutane is obtained. It is a colorless liquid, somewhat soluble in water and soluble in the usual organic solvents.

*Example 5.*—49 grams of 3,3-difluoropropene were introduced as a gas through a bubbler tube during 2–3 hours into a stirred aqueous solution of HOCl (0.2 gram mole) maintained at 0° C. The reaction mixture was allowed to stand overnight at −2° C. and then was stirred at −5° C. for 3 hours after which it was allowed to come up to room temperature during a period of 2 hours. The reaction mixture was saturated with sodium chloride and the reaction product which separated as a layer was removed by extraction with five 200 cc. portions of ethyl ether. The ethyl ether extract was dried over sodium sulfate and filtered. The ether was distilled off the ether extract and the residue remaining was fractionated through a packed column under reduced pressure. After obtaining a forerun of 6 grams, 43.5 grams of 3,3-difluoro-2-chloro-1-hydroxypropane, B. P. 64° C.–66° C./36 mm. were obtained. It has a boiling point of 138° C.–142° C. at atmospheric pressure. $N_D^{20}$ 1.4113.

It is a colorless liquid, somewhat soluble in water and soluble in the usual organic solvents.

By the use of 0.2 gram mole of an aqueous hypobromous acid solution in place of the aqueous HOCl solution used in the above example, a good yield of 3,3-difluoro-2-bromo-1-hydroxypropane is obtained. It is a colorless liquid, somewhat soluble in water and soluble in the usual organic solvents.

*Example 6.*—19.2 grams of 3,3,3-trifluoropropene, B. P. −24° C., were very slowly bubbled during 2 to 3 hours into 0.2 gram mole of an aqueous hypobromous acid solution cooled to −10° C. The reaction mixture was contained in a flask fitted with a sealed stirrer and a Dry Ice condenser. Stirring was continued for 3 hours at −10° C. after the addition of the 3,3,3-trifluoropropene after which the reaction mixture was allowed to come up to room temperature. Then the reaction mixture was saturated with sodium chloride and the reaction product which separated as a layer was removed by extracting the reaction mixture with five 50 cc. portions of ethyl ether. The ether extract was dried over sodium sulfate and filtered, after which the ether was distilled off from the filtrate. The residue remaining was fractionated under reduced pressure to yield 3,3,3-trifluoro-2-bromo-1-hydroxypropane. It is a colorless liquid, somewhat soluble in water and soluble in the usual organic solvents.

*Example 7.*—18.4 grams of 3,3-difluoro-2-methylpropene were reacted with 0.2 gram mole of an aqueous HOBr solution in accordance with the general procedure described in Example 2. Upon working up the reaction mixture in accordance with the procedure described in Example 2, 3,3 - difluoro-2-bromo-2-methyl-1-hydroxypropane is obtained. It is a colorless liquid soluble in ethyl alcohol and ethyl ether and somewhat soluble in water.

By the use of an aqueous HOCl solution in place of HOBr in the foregoing example, 3,3-difluoro-2-chloro-2-methyl-1-hydroxypropane is obtained. It is a colorless liquid, soluble in ethyl alcohol and ethyl ether and somewhat soluble in water.

*Example 8.*—58.5 grams of $CF_3CH_2CH_2CH_2Cl$ were added from a dropping funnel to a gently refluxing solution of 22.4 grams of potassium acetate and 240 ccs. of 90% ethyl alcohol. The addition was carried out over a period of 1½ to 2 hours following which the reaction mixture was heated for ½ to 1 hour longer. The 4,4,4-trifluoro-1-butene which collected in the Dry-Ice-acetone cooled receiver in good yield is a colorless, low boiling, mobile liquid.

*Example 9.*—In a 500 cc. three-necked flask were placed 240 ccs. of 90% ethyl alcohol and 22.4 grams of potassium hydroxide. The flask was fitted with an upright condenser and dropping funnel, and the condenser was connected through a calcium chloride filled drying tube to a Dry-Ice-acetone cooled condenser and receiver.

The mixture was heated to a gentle reflux to dissolve the potassium hydroxide and 63.6 grams of

were added from the dropping funnel during 1½ to 2 hours. Soon after the addition was begun, the reaction product began to condense in the Dry-Ice receiver at a slow but regular rate. After completion of the addition, heating was continued for ½ to 1 hour more. There was obtained a yield of 25.3 grams or 81% of 3,3-difluoro-1-propene, a colorless, mobile liquid boiling at 3°–4° C.

*Example 10.*—124 grams of ethyl difluoroacetate were added dropwise to 350 grams of methyl magnesium iodide contained in 750 grams of diethyl ether. The mixture was stirred and cooled when the reaction became too vigorous. After the addition was complete, the mixture was heated under reflux for three hours and then hydrolyzed by adding dilute hydrochloric acid, shaking, and separating the aqueous layer. The clear ether solution was dried over anhydrous calcium chloride, decanted, and the ether evaporated to obtain difluoromethyldimethyl carbinol

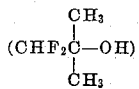

45 grams of the crude difluoromethyldimethyl carbinol thus obtained were added dropwise to 216 grams of phosphorous pentabromide contained in a flask fitted with a condenser, the top of which led to a water scrubber and then through a drying tube to a condenser cooled by means of a Dry-Ice-acetone mixture. The reaction mixture was heated on a water bath at 50–60° C. while the product collected slowly in the receiver also cooled by a Dry-Ice-acetone mixture. After about five hours at this temperature the collection of product practically ceased and heating was discontinued. 3,3-difluoro-2-methylpropene was thus obtained in the receiver. A similar amount of 2-difluoromethyl-1,2-dibromoethane remained in the reaction flask.

*Example 11.*—16.3 grams of 3,3,3-trifluoro-2-chloro-2-methyl-1-hydroxypropane were added to 20 ccs. of water at 20° C. following which 7.5 grams of finely powdered calcium hydroxide were added with shaking and stirring of the resulting mixture. On standing, a nonaqueous layer of reaction product separated and was distilled off under slightly reduced pressure by heating the mixture on a water bath. After drying and fractionating the product under reduced pressure, a 75% yield of pure 2-trifluoromethyl-2-methylethylene oxide having the formula:

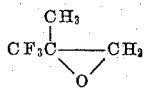

was obtained.

By the use of 14.5 grams of 3,3-difluoro-2-chloro-2-methyl-1-hydroxypropane in place of 3,3,3-trifluoro-2-chloro-2-methyl-1-hydroxypropane in the example just given, 2-difluoromethyl-2-methylethylene oxide is obtained.

*Example 12.*—To 14.5 grams of 3,3-difluoro-2-chloro-1-hydroxybutane were added slowly with stirring 20 grams of a 20% solution of sodium hydroxide in water. Stirring was continued at 20–25° C. for 15 to 30 minutes following which the nonaqueous layer which separated was distilled off. The product was purified by drying and fractionally distilling it under slightly reduced pressure.

A 70% yield of 3,3-difluoro-1,2-n-butylene oxide having the formula:

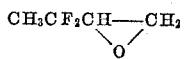

was obtained.

*Example 13.*—To 14.9 grams of 3,3,3-trifluoro-2-chloro-1-hydroxypropane were added slowly, with stirring, 20 grams of a 20% solution of sodium hydroxide in water. Stirring was continued at 20–25° C. for 15 to 30 minutes following which the nonaqueous layer which separated was distilled off. The product was purified by drying and fractionally distilling it under slightly reduced pressure. A good yield of 3,3,3-trifluoro-1,2-propylene oxide having the formula:

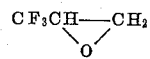

was thus obtained.

*Example 14.*—To 16.3 grams of 4,4,4-trifluoro-2-hydroxy-1-chlorobutane were added slowly, with stirring, 20 grams of a 20% aqueous solution of sodium hydroxide. Stirring was continued at 20–25° C. for 15 to 30 minutes following which the nonaqueous layer which separated was distilled off. The product was purified by drying and fractionally distilling it under slightly reduced pressure. A good yield of 4,4,4-trifluoro-1,2-butylene oxide was thus obtained.

*Example 15.*—To 13 grams of 3,3-difluoro-2-chloro-1-hydroxypropane were added portionwise, with stirring, 20 grams of a 20% aqueous sodium hydroxide solution. Stirring was continued at 20–25° C. for 15 to 30 minutes following which the nonaqueous layer which separated was distilled off. The product was purified by drying and fractionally distilling it under slightly reduced pressure. A good yield of 3,3-difluoro-1,2-propylene oxide was thus obtained.

It will be understood that in Examples 11 to 15, inclusive, an equivalent amount of the corresponding bromohydrin compound can be used in place of the chlorohydrin compound. Thus 3,3,3-trifluoro-2-bromo-2-methyl-1-hydroxypropane can be used in place of 3,3,3-trifluoro-2-chloro-2-methyl-1-hydroxypropane in Example 11.

Following the procedure described in Examples 16 to 21, inclusive, N-n-butyl-3,3,3-trifluoro-2-hydroxypropylamine, N,N - (di-β-hydroxyethyl)-3,3-difluoro-2-hydroxypropylamine, N,N-(di-n-butyl)-3,3,3-trifluoro-2-hydroxypropylamine, N,N-(dimethyl) - 3,3 - difluoro-2-hydroxypropylamine, etc. are readily prepared.

*Example 16.*—10 grams of 3,3,3-trifluoro-1,2-propylene oxide were added to 50 grams of aniline and the reaction mixture thus obtained was heated in a shaking autoclave at 180° C. for 8–12 hours. When cool the reaction mixture was removed from the autoclave and the reaction product was extracted from the reaction mixture with methyl alcohol, following which the methyl alcohol was fractionally distilled under reduced pressure (e. g. 5–10 mm). A good yield of N-β-hydroxy-γ-trifluoropropylaniline was obtained as a water-white liquid. A small amount of N-bis-β-hydroxy-γ-trifluoropropylaniline was obtained as a by-product.

*Example 17.*—18.6 grams of aniline and 44.8 grams of 3,3,3-trifluoro-1,2-propylene oxide were reacted together in a shaking autoclave at 180° C. for about 8 hours. When cool, the reaction mixture was removed and fractionally distilled under reduced pressure to obtain N-bis-β-hydroxy-γ-trifluoropropylaniline.

*Example 18.*—12 grams of N-ethylaniline and 12 grams of 3,3,3-trifluoro-1,2-propylene oxide were reacted together in accordance with the procedure described in Example 17. Upon fractionating the reaction mixture under reduced pressure, N-ethyl-N-β-hydroxy-γ-trifluoropropylaniline was obtained.

*Example 19.*—10 grams of 3,3-difluoro-1,2-propylene oxide were reacted with 50 grams of aniline in accordance with the procedure described in Example 16. Upon fractionally distilling the reaction mixture under reduced pressure, N-β-hydroxy-γ-difluoropropylaniline was obtained.

*Example 20.*—12 grams of 3,3-difluoro-1,2-n-butylene oxide were reacted with 50 grams of aniline in accordance with the procedure described in Example 16. Upon fractionally distilling the reaction mixture under reduced pressure, N-β-hydroxy-γ-difluoro-n-butylaniline was obtained.

Following the procedure described in Examples 16 to 20, inclusive, N-β-hydroxy-β-methyl-γ-trifluoropropylaniline, N - β - hydroxy-β-methyl-γ-difluoropropylaniline, N-β-hydroxy-δ-trifluorobutylaniline, N-β-hydroxy - γ - trifluoropropyl-m-toluidine, N-β-hydroxy-γ-trifluoropropyl-m-chloroaniline, N-β-hydroxy-γ-difluoropropyl-m-toluidine and N-β-hydroxy-γ-difluoropropyl-m-chloroaniline, for example, are readily prepared.

*Example 21.*—13.5 grams of N-ethyl-m-toluidine, 10 grams of sodium bicarbonate and 16.3 grams of 3,3,3-trifluoro-2-chloro-1-hydroxypropane were reacted together at 140° C. until no more carbon dioxide was evolved. Then the reaction product was extracted from the reaction mixture with methyl alcohol and the extract was fractionally distilled under reduced pressure to obtain N - ethyl-N-α-trifluoromethyl-β-hydroxyethyl-m-toluidine having the formula:

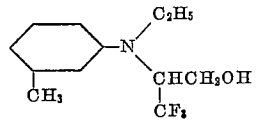

*Example 22.*—13.7 grams of N-β-hydroxyethylaniline, 18 grams of 4,4,4-trifluoro-2-hydroxy-1-chlorobutane and 10 grams of sodium bicarbonate were reacted together, and the reaction mixture was worked up, in accordance with the procedure described in Example 21. N-β-hydroxyethyl-N-β-hydroxy-δ-trifluorobutylaniline was obtained.

*Example 23.*—9.3 grams of aniline, 14.4 grams of 3,3-difluoro-2-chloro-1-hydroxypropane and 10 grams of sodium bicarbonate were reacted together, and the reaction mixture was worked up, in accordance with the procedure described in Example 21. N-α-difluoromethyl-β-hydroxyethylaniline was obtained.

*Example 24.*—13.3 grams of tetrahydroquinoline and 12 grams of 3,3,3-trifluoro-1,2-propylene oxide were reacted together in accordance with the procedure described in Example 17. Upon fractionally distilling the reaction mixture under reduced pressure, N-β-hydroxy-γ-trifluoropropyltetrahydroquinoline was obtained.

*Example 25.*—By the use of 13.1 grams of benzomorpholine, i. e.

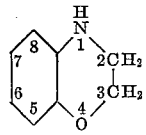

in place of tetrahydroquinoline in Example 24, N-β-hydroxy-γ-trifluoropropylbenzomorpholine was obtained.

*Example 26.*—13.3 grams of tetrahydroquinoline, 18 grams of 4,4,4-trifluoro-2-hydroxy-1-chlorbutane and 10 grams of sodium bicarbonate were reacted together in accordance with the procedure described in Example 21. N-β-hydroxy-δ-trifluorobutyltetrahydroquinoline was obtained.

*Example 27.*—13.1 grams of benzomorpholine, 14.4 grams of 3,3-difluoro-2-chloro-1-hydroxypropane and 10 grams of sodium bicarbonate were reacted together in accordance with the procedure described in Example 21. N-α-difluoromethyl-β-hydroxyethylbenzomorpholine was obtained.

Following the procedure described hereinbefore N-β-hydroxyethyl-N-β-hydroxy-γ-difluoropropylaniline, N - β - hydroxyethyl-N-β-hydroxy-γ-trifluoropropylaniline, N-β-hydroxyethyl-N-β-hydroxy - γ - trifluoropropyl-m-chloroaniline, N - β - hydroxy-γ-trifluoropropyl-2-methyltetrahydroquinoline, N-β-hydroxy-γ-trifluoropropyl-2,5-dimethyltetrahydroquinoline, N - β - hydroxy-γ-difluoropropyl-2-methylbenzomorpholine, N-β-hydroxy-γ-difluoropropyl-2,5-dimethylbenzomorpholine, N - β - hydroxy-γ-trifluoropropyl-2-methylbenzomorpholine, N-β-hydroxy-γ-trifluoropropyl-α-naphthylamine, N-β-hydroxy-γ-difluoropropyl-α-naphthylamine, 1-N-β-hydroxy-γ-trifluoropropylamino-5 - naphthol, N-β-hydroxy-δ-trifluorobutyl-α-naphthylamine, etc., are readily prepared.

As previously indicated, the new halohydrin compounds make possible the preparation of azo compounds having the formulas:

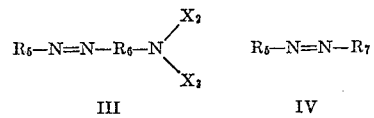

wherein $R_5$ represents a monocyclic aryl nucleus of the benzene series, $R_6$ represents a monocyclic aryl nucleus of the benzene series or a naphthalene nucleus, $X_2$ represents a 3,3,3-trifluoro-2-hydroxypropyl group, a 3,3-difluoro-2-hydroxypropyl group, a 3,3,3-trifluoro-2-methyl-2-hydroxypropyl group, a 3,3-difluoro-2-methyl-2-hydroxypropyl group, a 4,4,4-trifluoro-2-hydroxybutyl group, a 4,4-difluoro-2-hydroxybutyl group, an α-trifluoromethyl-β-hydroxyethyl group

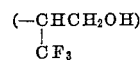

an α-difluoromethyl-β-hydroxyethyl group

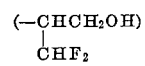

an α-methyl-α-trifluoromethyl-β-hydroxyethyl group

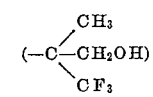

an α-methyl-α-difluoromethyl-β-hydroxyethyl group

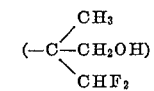

or an α-(α,α-difluoroethyl)-β-hydroxyethyl group

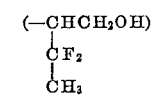

$X_3$ represents in addition to $X_2$ a hydrogen atom, a β-hydroxyethyl group, a β-hydroxypropyl group, a γ-hydroxypropyl group, a β,γ-dihydroxypropyl group, a δ-hydroxybutyl group, an alkyl group having one to four, inclusive, carbon atoms or a monoalkoxyalkyl group having three to four, inclusive, carbon atoms, $R_7$ represents a tetrahydroquinoline nucleus or a benzomorpholine nucleus and wherein the nuclear nitrogen atom of said tetrahydroquinoline or benzomorpholine nucleus contains an $X_2$ group, wherein $X_2$ has the meaning given to it above. The preparation of the above azo compounds is illustrated hereinafter.

*Example 28.*—0.1 gram mole of o-aminophenylmethylsulfone is diazotized in the usual manner and the diazonium solution obtained is added to an iced hydrochloric acid solution containing 0.1 gram mole of N-β-hydroxy-γ-trifluoropropylaniline. The coupling reaction which takes place is completed by adding sodium carbonate. The dye compound which forms is recovered by filtration, washed with water and dried. It has the formula:

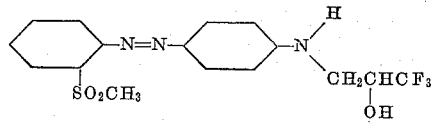

and colors cellulose acetate textile materials orange shades.

By the use of 0.1 gram mole of N-β-hydroxy-γ-difluoropropylaniline in place of N-β-hydroxy-γ-trifluoropropylaniline in the foregoing example, a dye compound is obtained which similarly colors cellulose acetate textile materials orange shades.

*Example 29.*—0.1 gram mole of p-aminoacetophenone is diazotized in the usual manner and the diazonium compound obtained is coupled with 0.1 gram mole of N-ethyl-N-β-hydroxy-γ-trifluoropropylaniline. The coupling reaction is carried out in an iced hydrochloric acid solution. Upon completion of the coupling reaction, the dye compound is recovered by filtration, washed well with water and dried. It colors cellulose acetate textile materials orange shades.

*Example 30.*—0.1 gram mole of p-nitroaniline is diazotized and the diazonium compound obtained is coupled with 0.1 gram mole of N-bis-β-hydroxy-γ-trifluoropropyl-m-toluidine. The coupling reaction is carried out in an iced hydrochloric acid medium. Upon completion of the coupling reaction, the dye compound formed is recovered by filtration, washed well with water and dried. It colors cellulose acetate textile materials scarlet shades.

By the use of 0.1 gram mole of N-bis-β-hydroxy-γ-difluoropropyl-m-toluidine in place of N-bis-β-hydroxy-γ-trifluoropropyl-m-toluidine in the foregoing example, a dye compound is obtained which likewise colors cellulose acetate textile materials scarlet shades.

*Example 31.*—0.1 gram mole of p-nitro-o-chloroaniline is diazotized and the diazonium compound obtained is coupled in the usual manner with 0.1 gram mole of N-β-cyanoethyl - N - β - hydroxy - γ - trifluoropropyl - m-chloroaniline. Coupling is carried out in an iced hydrochloric acid solution. Upon completion of the coupling reaction, the dye compound formed is recovered by filtration, washed with water and dried. It colors cellulose acetate textile materials scarlet shades.

*Example 32.*—0.1 gram mole of p-nitro-o-fluoroaniline is diazotized in the usual manner and the diazonium compound obtained is coupled in the usual manner with 0.1 gram mole of N-β-hydroxy-ethyl-N-β-hydroxy-β-methyl-γ-trifluoropropyl-2-methoxy-5-chloroaniline. Upon completion of the coupling reaction which is carried out in an iced hydrochloric acid solution, the dye compound formed is recovered by filtration, washed with water and dried. It colors cellulose acetate textile materials pinkish-scarlet shades.

*Example 33.*—0.1 gram mole of p-nitroaniline is diazotized and the diazonium compound obtained is coupled in the usual manner with 0.1 gram mole of N-β-carbomethoxyethyl-N-β-hydroxy-γ-difluoropropylaniline. Upon completion of the coupling reaction, the dye compound formed is recovered by filtration, washed with water and dried. It colors cellulose acetate textile materials orange shades.

*Example 34.*—0.1 gram mole of 5-nitro-2-trifluoromethylaniline is diazotized with nitrosyl sulfuric acid and the diazonium compound thus obtained is poured into water. The solution thus formed is added to 0.1 gram of 1-N-β-hydroxy-γ-trifluoropropylamino-5-naphthol. The coupling reaction which takes place is completed by adding sodium carbonate. The dye compound formed is recovered by filtration, washed well with water and dried. It colors cellulose acetate textile materials greenish-blue shades.

*Example 35.*—0.1 gram mole of 2-amino-5-nitrophenylmethylsulfone is diazotized in nitrosyl sulfuric acid and the diazonium compound obtained is added to a cold dilute sulfuric acid solution of N-β-hydroxy-γ-trifluoropropyl-2-methyltetrahydroquinoline. The coupling reaction which takes place is completed by adding sodium carbonate. The dye compound formed is recovered by filtration, washed well with water and dried. It colors cellulose acetate textile materials violet shades.

*Example 36.*—0.1 gram mole of 2-amino-5-nitrobenzenesulfonethylamide is diazotized in a mixture of nitrosyl sulfuric acid, sulfuric acid and acetic acid. The diazonium solution thus obtained is poured into water and the precipitated diazonium compound is recovered by filtration, washed with water and then added to an acetic acid solution of 1 gram mole of N-β-hydroxy-γ-trifluoropropyl-2,7 - dimethyltetrahydroquinoline. Upon completion of the coupling reaction which takes place, the dye compound formed is precipitated by adding water, recovered by filtration, washed with water and dried. It colors cellulose acetate textile materials violet shades.

*Example 37.*—0.1 gram mole of 2-amino-5-nitrophenylmethylsulfone is diazotized in nitrosyl sulfuric acid and the diazonium compound obtained is added to a cold dilute sulfuric acid solution of 0.1 gram mole of N-β-hydroxy-γ-trifluoropropyl - 3 - methyl - benzomorpholine. The coupling reaction which takes place is completed by adding sodium carbonate. The dye compound that forms is recovered by filtration, washed well with water and dried. It colors cellulose acetate textile materials violet shades.

The following tabulation further illustrates these azo compounds, together with the color they produce on cellulose acetate textile materials. The compounds indicated below may be prepared by diazotizing the amines listed under the heading "Amine" and coupling with the compound specified in the column entitled "Coupling Components." The diazotization and coupling reactions are carried out following standard procedures such as those disclosed in Examples 28 to 37, inclusive.

| Amine | Coupling Components | Color |
| --- | --- | --- |
| o - aminophenyl - methylsulfone. | N - β - hydroxy - γ - trifluoropropylaniline. | Yellowish-red. |
| Do | N - β - hydroxy - γ - trifluoropropyl - α - napththylamine. | Do. |
| p-aminoacetophenone | N - β - hydroxy - γ - difluoropropylaniline. | Yellowish-orange. |
| Do | N - β - hydroxy - γ - difluoropropyl-o-chloroaniline. | Do. |
| Do | 1 - N - β - hydroxy - γ - trifluoropropylamino - 5 - naphthol. | Do. |
| p-nitroaniline | N - β - hydroxy - γ - difluoropropyl-o-toluidine. | Do. |
| Do | N - β - hydroxy - γ - trifluoropropyl-m-chloroaniline. | Yellowish-red. |
| Do | N - β - hydroxy - β - methyl - γ - difluoropropyl - m - chloroaniline. | Do. |
| Do | 1 - N - β - hydroxy - γ - trifluoropropylamino - 5 - naphthol. | Violet. |
| Do | N - β - cyanoethyl - N - β - hydroxy - γ - difluoropropylaniline. | Red. |
| Do | N - β - hydroxy - γ - trifluoropropyltetrahydroquinoline. | Red violet. |
| p-nitro-o-chloroaniline | N - β - hydroxy - γ - trifluoropropylbenzomorpholine. | Do. |
| Do | N - β - hydroxy - δ - trifluorobutyl - 2 - methylbenzomorpholine. | Do. |
| Do | N - ethyl - N - β - hydroxy - γ-difluoropropylaniline. | Red. |
| Do | N - β - hydroxy - δ - trifluorobutylaniline. | Do. |
| Do | N,N - di(β - hydroxy - γ - trifluoropropyl)aniline. | Do. |
| 2-nitro-4-cyanoaniline | N - ethyl - N - β - hydroxy - γ - trifluoropropyl - m - chloroaniline. | Rubine. |
| Do | N - ethyl - N - β - hydroxy - γ-trifluoropropylaniline. | Do. |
| Do | N - β - hydroxy - δ - trifluorobutyl-α-naphthylamine. | Violet. |
| Do | N - β - hydroxy - γ - difluoropropyl-α-naphthylamine. | Do. |
| p-nitro-o-cyanoaniline | 1 - N - β - hydroxy - γ - trifluoropropylamino - 5 - naphthol. | Blue. |

| Amine | Coupling Components | Color |
|---|---|---|
| p-nitro-o-cyanoaniline | N - ethyl - N - β - hydroxy - γ - trifluoropropyl - m - toluidine. | Rubine. |
| Do | N - β - hydroxy - γ - trifluoropropylaniline. | Red. |
| 2-nitro-4-thiocyanoaniline | N - β - hydroxy - γ - difluoropropylaniline. | Orange. |
| Do | N - ethyl - N - β - hydroxy - γ - trifluoropropyl - m - anisidine. | Do. |
| Do | N - methyl - β - hydroxy - γ - difluoropropylaniline. | Do. |
| p - nitro - o - trifluoro - methylaniline. | N - ethyl - N - β - hydroxy - γ - trifluoropropyl - o - anisidine. | Rubine. |
| Do | N - ethyl - N - β - hydroxy - γ - trifluoropropylcresidine. | Do. |
| Do | N - β - hydroxy - γ - trifluoropropyl - 2, 7 - dimethyltetra - hydroquinoline. | Violet. |
| Do | N - β - hydroxy - γ - difluoropropyl - 2,5 - dimethyl - benzomorpholine. | Rubine. |
| p-nitro-o-methoxy-aniline | N - β - hydroxy - γ - trifluoropropylaniline. | Red. |
| Do | N - ethyl - N - β - hydroxy - β - methyltrifluoropropyl - m - toluidine. | Rubine. |
| p-nitro-o-methyl-aniline | N - β - hydroxy - γ - trifluoropropylaniline. | Orange. |
| Do | N - β - hydroxyethyl - N - β - hydroxy - γ - trifluoropropylaniline. | Red. |
| Do | N - β - cyanoethyl - N - β - hydroxy - γ - difluoropropylaniline. | Do. |
| 2-amino-5-nitro-phenylmethylketone. | N - β - sulfatoethyl - N - β - hydroxy - γ - trifluoropropylaniline. | Rubine. |
| Do | N - β - hydroxy - γ - trifluoropropyl - 2 - methyltetrahydroquinoline. | Do. |
| Do | N - β - hydroxy - δ - difluorobutyltetrahydroquinoline. | Do. |
| Do | N - β - hydroxy - δ - difluorobutylaniline. | Do. |
| 2-amino-5-nitro-phenylmethyl - sulfone. | N - β - hydroxy - δ - difluorobutyl - m - chloroaniline. | Do. |
| Do | N - β - hydroxy - γ - trifluoropropyl - 2 - methylbenzomorpholine. | Do. |
| 2 - amino - 5 - nitro - benzenesulfon - ethylamide. | N - β - hydroxy - γ - trifluoropropylaniline. | Red. |
| Do | N - β - hydroxy - γ - difluoropropyl - 2 - methylbenzomorpholine. | Rubine. |
| Do | N - β - hydroxy - γ - trifluoropropyl-2,5-dimethylbenzomorpholine. | Violet. |
| 2,4-dinitro-aniline | N - β - hydroxy - γ - trifluoropropyl-m-bromoaniline. | Rubine. |
| Do | N - β - hydroxy - N - γ - difluoro - propyl - 2, 7 - di - methylbenzo-morpholine. | Violet. |
| 2,4-dinitro-6-chloroaniline | N - β - hydroxy - γ - trifluoropropyl - m - fluoroaniline. | Do. |
| Do | N - β - sulfatoethyl - N - β - hydroxy - γ - trifluoropropylaniline. | Do. |
| Do | N - β - hydroxy - γ - trifluoropropyl - α - naphthylamine. | Blue. |
| 2, 4 - dinitro - 6 - hydroxy - aniline. | N - β - hydroxy - γ - difluoropropylaniline. | Violet. |
| Do | N - β - hydroxypropyl - N - β - hydroxy - γ - trifluoropropylaniline. | Do. |
| 2,4-dinitro-6-cyanoaniline | N - β - hydroxy - γ - trifluoropropylaniline. | Do. |
| Do | N - β - hydroxyethyl - N - β - hydroxy - γ - difluoropropylaniline. | Do. |
| Do | N - β - hydroxy - γ - trifluoropropyl - 2, 7 - dimethyl - benzomorpholine. | Do. |
| 2, 4 - dinitro - 6 - trifluoro - methylaniline. | 1-N-β-hydroxy - γ - trifluoropropylamino - 5 - naphthol. | Blue. |
| Do | N - β - hydroxy - γ - trifluoropropyl - 2, 7 - dimethyl - tetrahydro - quinoline. | Do. |
| Do | N - β - hydroxy - γ - trifluoropropyl - 5 - aceto - amino - tetrahydroquinoline. | Do. |
| Do | N - allyl - N - β - hydroxy - γ - trifluoropropylaniline. | Violet. |
| 2 - amino - 3, 5 - dinitro - benzene - sulfonethyl - amide. | N - β - hydroxy - γ - difluoropropylaniline. | Rubine. |
| 2 - amino - 3, 5 - dinitro - phenylmethylsulfone. | N - β - hydroxy - γ - trifluoropropylaniline. | Do. |
| Do | 1 - N - β - hydroxy - γ - trifluoro - propylamino - 5 - naphthol. | Blue. |

The new azo compounds described herein may be advantageously directly applied to the material undergoing coloration in the form of an aqueous suspension which can be prepared by grinding the dye to a paste in the presence of a sulfonated oil, soap, sodium lignin sulfonate, or other suitable dispersing agent and dispersing the resulting paste in water.

Direct dyeing operations can, with advantage, be conducted at temperatures of about 70° C.–90° C. but any suitable temperature can be used. Thus, the textile material such as cellulose acetate, for example, to be dyed or colored is ordinarily added to the dye bath at a temperature lower than that at which the main portion of the dyeing is to be effected. A temperature approximating 45° C.–55° C., for example, following which the temperature is raised to that selected for carrying out the dyeing operation. The temperature at which the dyeing is conducted may, of course, be varied somewhat depending upon the particular material undergoing coloration. As is understood by those skilled in the dyeing art, the intensity of dyeing can be varied by varying the proportion of the dye to material undergoing coloration. The amount of dye used can be, for example, ⅓% to 3% (by weight) of that of the textile material, although lesser or greater amounts of dye can be used.

The present application is a division of our copending U. S. application Serial No. 211,177, filed February 15, 1951, now Patent No. 2,700,686 and is related to our copending U. S. application Serial No. 296,748, filed July 1, 1952 which is a division of U. S. application Serial No. 211,177. Our U. S. application Serial No. 211,177 claims certain of the halohydrin compounds disclosed hereinbefore and the process for their preparation. Our U. S. application Serial No. 296,748 claims anthraquinone compounds containing a hydroxy substituted polyfluorinated group.

We claim:
1. The azo compounds free of water-solubilizing substituents and having the formula:

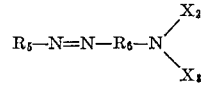

wherein $R_5$ represents a monocyclic aryl nucleus of the benzene series, $R_6$ represents a member selected from the group consisting of a monocyclic aryl nucleus of the benzene series and a mononaphthalene nucleus, $X_2$ represents a member selected from the group consisting of a 3,3,3-trifluoro-2-hydroxypropyl group, a 3,3-difluoro-2-hydroxypropyl group, a 3,3,3-trifluoro-2-methyl-2-hydroxypropyl group, a 3,3-difluoro-2-methyl-2-hydroxypropyl group, a 4,4,4-trifluoro-2-hydroxybutyl group, a 4,4-difluoro-2-hydroxybutyl group, an α-trifluoromethyl-β-hydroxyethyl group, an α-difluoromethyl-β-hydroxyethyl group, an α - methyl - α - trifluoromethyl - β - hydroxyethyl group, an α - methyl - α - difluoromethyl - β - hydroxyethyl group and an α-(α,α-difluoroethyl)-β-hydroxyethyl group and $X_3$ represents a member selected from the group consisting of a hydrogen atom, a β-hydroxyethyl group, a β-hydroxypropyl group, a γ-hydroxypropyl group, a β,γ-dihydroxypropyl group, a δ-hydroxybutyl group, an alkyl group having 1 to 4, inclusive, carbon atoms, a monoalkoxyalkyl group having 3 to 4, inclusive, carbon atoms, a 3,3,3-trifluoro-2-hydroxypropyl group, a 3,3-difluoro-2-hydroxypropyl group, a 3,3,3-trifluoro-2-methyl-2-hydroxypropyl group, a 3,3-difluoro-2-methyl-2-hydroxypropyl group, a 4,4,4-trifluoro-2-hydroxybutyl group, a 4,4-difluoro-2-hydroxybutyl group, an α-trifluoromethyl-β-hydroxyethyl group, an α-difluoromethyl-β-hydroxyethyl group, an α-methyl-α-trifluoromethyl-β-hydroxyethyl group, an α-methyl-α-difluoromethyl-β-hydroxyethyl group and an α-(α,α-difluoroethyl)-β-hydroxyethyl group and wherein the

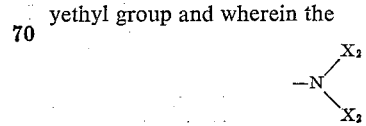

group is in para position to the azo bond.

2. The azo compounds free of water-solubilizing substituents and having the formula:

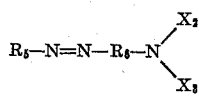

wherein $R_5$ represents a monocyclic aryl nucleus of the benzene series, $R_6$ represents a monocyclic aryl nucleus of the benzene series, $X_2$ represents a member selected from the group consisting of a 3,3,3-trifluoro-2-hydroxypropyl group, a 3,3-difluoro-2-hydroxypropyl group, a 3,3,3-trifluoro-2-methyl-2-hydroxypropyl group, a 3,3-difluoro-2-methyl-2-hydroxypropyl group, a 4,4,4-trifluoro-2-hydroxybutyl group, a 4,4-difluoro-2-hydroxybutyl group, an α-trifluoromethyl-β-hydroxyethyl group, an α-difluoromethyl-β-hydroxyethyl group, an α-methyl-α-trifluoromethyl-β-hydroxyethyl group, an α-methyl-α-difluoromethyl-β-hydroxyethyl group and an α-(α,α-difluoroethyl)-β-hydroxyethyl group and $X_3$ represents a member selected from the group consisting of a hydrogen atom, a β-hydroxyethyl group, a β-hydroxypropyl group, a γ-hydroxypropyl group, a β,γ-dihydroxypropyl group, a δ-hydroxybutyl group, an alkyl group having 1 to 4, inclusive, carbon atoms, a monoalkoxyalkyl group having 3 to 4, inclusive, carbon atoms, a 3,3,3-trifluoro-2-hydroxypropyl group, a 3,3-difluoro-2-hydroxypropyl group, a 3,3,3-trifluoro-2-methyl-2-hydroxypropyl group, a 3,3-difluoro-2-methyl-2-hydroxypropyl group, a 4,4,4-trifluoro-2-hydroxybutyl group, a 4,4-difluoro-2-hydroxybutyl group, an α-trifluoromethyl-β-hydroxyethyl group, an α-difluoromethyl-β-hydroxyethyl group, an α-methyl-α-trifluoromethyl-β-hydroxyethyl group, an α-methyl-α-difluoromethyl-β-hydroxyethyl group an α-(α,α-difluoroethyl)-β-hydroxyethyl group and wherein the

group is in para position to the azo bond.

3. The azo compound having the formula:

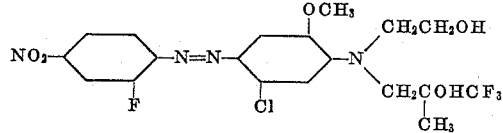

4. The azo compound having the formula:

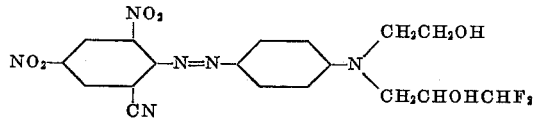

5. The azo compound having the formula:

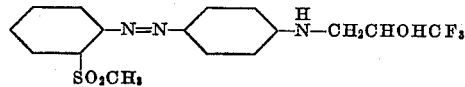

References Cited in the file of this patent
UNITED STATES PATENTS

| | | |
|---|---|---|
| 2,432,393 | Dickey et al. | Dec. 9, 1947 |
| 2,442,345 | Dickey et al. | June 1, 1948 |
| 2,448,871 | Dickey et al. | Sept. 7, 1948 |
| 2,590,092 | Dickey | Mar. 25, 1952 |
| 2,594,297 | Dickey | Apr. 29, 1952 |